Nov. 25, 1924.  
W. G. WADE  
FRONT SPRING MOUNTING  
Filed Sept. 27, 1921  
1,517,134
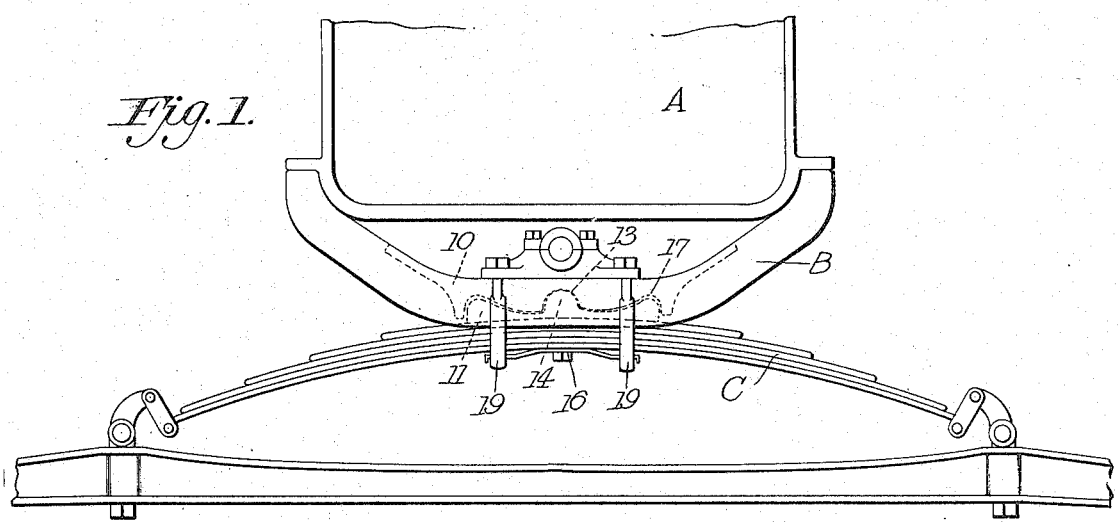
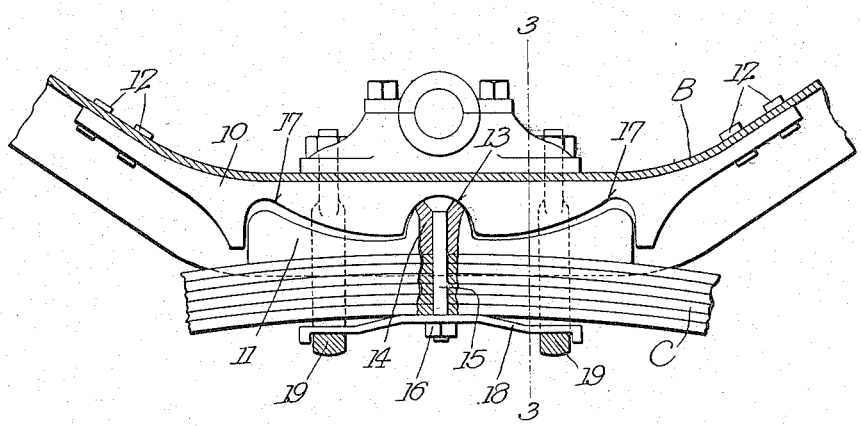
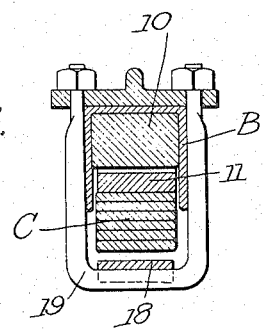
W. G. Wade  
INVENTOR  
BY Victor J. Evans  
ATTORNEY Patented Nov. 25, 1924.

1,517,134

UNITED STATES PATENT OFFICE.

WALTER G. WADE, OF ROANOKE, VIRGINIA.

FRONT-SPRING MOUNTING.

Application filed September 27, 1921. Serial No. 503,510.

*To all whom it may concern:*

Be it known that I, WALTER G. WADE, a citizen of the United States, residing at Roanoke, in the county of Roanoke and State of Virginia, have invented new and useful Improvements in Front-Spring Mountings, of which the following is a specification.

This invention comprehends the provision of an automobile attachment, primarily intended for use in conjunction with Ford automobiles, and designed to permit of a slight rocking movement between the front spring of the vehicle and the frame thereof so that the body of the vehicle will be maintained in a more or less upright position when moving over rough territory.

More specifically stated, the invention comprehends the provision of a two-part attachment interposed between the front spring of the vehicle and the frame thereof, the respective parts of the attachment being secured to the spring and frame and designed to permit of rocking movement of the running gear with respect to the body of the vehicle for the purpose above mentioned, yieldable means being also employed to assist in holding the vehicle in an upright position under all conditions.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views and wherein:—

Figure 1 is a fragmentary front elevation of a motor vehicle equipped with the present invention.

Figure 2 is a similar view, partly in section.

Figure 3 is a sectional view taken on line 3—3 of Figure 2.

Referring to the drawing in detail, A indicates the radiator of a motor vehicle which reposes upon the frame B, the front spring C supporting the frame at one end in the usual manner.

The attachment forming the subject matter of the present invention comprises two parts or members indicated at 10 and 11 respectively, and both of which are interposed between the frame B and the adjacent spring C of the vehicle as clearly shown in Figure 1.

The member 10 is secured as at 12 to the frame B of the vehicle and is formed to provide a central depression 13 to accommodate a ball-like projection 14 formed on the member 11 which is secured to the spring. The member 11 is secured to the spring C by means of a bolt 15 which passes centrally through the member, through the spring C and has associated therewith a nut 16. The member 10 is also formed to provide recesses 17 at the opposite sides of the recess 13, while the member 11 has projections formed which are shaped to accommodate themselves to the recesses 17, so that the members are held operatively associated, it being understood that the interfitting association of the members 10 and 11 provides for a rocking movement of the running gear with relation to the body of the vehicle, for the express purpose of maintaining the body of the vehicle in an upright position when the machine is travelling over irregular surfaces. In other words, either of the front wheels of the vehicle, can enter a depression in the road without disturbing the equilibrium of the vehicle.

Arranged beneath the spring C is a leaf spring 18 which is secured to the front spring C at its center by means of the bolt 15. The opposite ends of the spring 18 are straddled and engaged by the U-shaped spring clips 19 which are used to secure the springs to the frame B. Obviously, when the front wheels of the vehicle pass over irregular surfaces, the spring 18 is utilized to assist in holding the body of the vehicle in a true upright position.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:—

A front spring mounting for motor vehicles comprising a member conforming to the curvature of the front frame of the vehicle and being secured at its ends thereto, said member being provided with a centrally disposed recess and from the lower side edges of said recess the lower wall thereof inclines upwardly and is thence disposed downwardly providing a recess on each side thereof, said recesses being arranged at equi-distances and normally in the same horizontal plane, an upper member carried by the front spring of the vehicle and being associated with the member first mentioned, a plurality of projections rising from the spring member and being formed thereon to accommodate themselves to the recesses, the intermediate of said projections being ball like in formation and extending above the upper ends of the end projections thereby providing a space between the end projections and the end recesses, a bolt passing through the intermediate projection and spring respectively, a leaf spring engaging the bottom of the vehicle spring and secured thereto through the medium of the bolt, said leaf spring being adapted to assist in holding the body of the vehicle in a true upright position and a pair of U-shaped spring clips surrounding the front frame and spring and being engaged by the ends of the leaf spring in a manner to hold said spring clips in operative position.

In testimony whereof I affix my signature.

WALTER G. WADE.